United States Patent
Bertilsson

(10) Patent No.: US 7,055,493 B2
(45) Date of Patent: Jun. 6, 2006

(54) METHOD FOR FUEL INJECTION IN A COMBUSTION ENGINE, AND COMBUSTION ENGINE

(75) Inventor: Tommy Bertilsson, Sodertalje (SE)

(73) Assignee: Scania CV AB (publ) (SE)

( * ) Notice: Subject to any disclaimer, the term of this patent is extended or adjusted under 35 U.S.C. 154(b) by 0 days.

(21) Appl. No.: 10/497,383

(22) PCT Filed: Nov. 27, 2002

(86) PCT No.: PCT/SE02/02176

§ 371 (c)(1),
(2), (4) Date: Jun. 1, 2004

(87) PCT Pub. No.: WO03/046344

PCT Pub. Date: Jun. 5, 2003

(65) Prior Publication Data

US 2005/0072401 A1    Apr. 7, 2005

(30) Foreign Application Priority Data

Nov. 30, 2001   (SE) .................................. 0104038

(51) Int. Cl.
  *F02B 3/06*   (2006.01)
  *F02B 17/00*  (2006.01)
  *B60T 7/12*   (2006.01)
(52) U.S. Cl. ..................... 123/299; 123/305
(58) Field of Classification Search ........ 123/299, 123/300, 305, 435, 436, 698, 568.11, 568.14, 123/443, 295
See application file for complete search history.

(56) References Cited

U.S. PATENT DOCUMENTS

| 4,704,999 | A  |    | 11/1987 | Hashikawa et al. |
| 6,286,466 | B1 | *  | 9/2001  | Braun et al. ................. 123/21 |
| 6,378,487 | B1 | *  | 4/2002  | Zukouski et al. ........... 123/299 |
| 6,386,177 | B1 | *  | 5/2002  | Urushihara et al. ......... 123/299 |
| 6,443,108 | B1 | *  | 9/2002  | Brehob et al. ................ 123/64 |
| 6,505,601 | B1 | *  | 1/2003  | Jorach et al. ................ 123/295 |
| 6,609,493 | B1 | *  | 8/2003  | Yamaguchi et al. ........ 123/299 |
| 6,619,255 | B1 | *  | 9/2003  | Urushihara et al. ......... 123/295 |
| 6,622,690 | B1 | *  | 9/2003  | Ando et al. .................. 123/295 |
| 6,659,068 | B1 | *  | 12/2003 | Urushihara et al. ......... 123/295 |
| 6,688,279 | B1 | *  | 2/2004  | Ishikawa et al. ............ 123/299 |
| 6,840,211 | B1 | *  | 1/2005  | Takahashi ................... 123/299 |
| 6,863,058 | B1 | *  | 3/2005  | Kurtz et al. ................. 123/672 |
| 6,910,449 | B1 | *  | 6/2005  | Strom et al. .............. 123/90.16 |

(Continued)

FOREIGN PATENT DOCUMENTS

DE    1 96 39 172    4/1998

(Continued)

OTHER PUBLICATIONS

International Search Report dated Jan. 27, 2003.

*Primary Examiner*—Hai Huynh
(74) *Attorney, Agent, or Firm*—Ostrolenk, Faber, Gerb & Soffen, LLP

(57) ABSTRACT

A method and a device for fuel injection in a supercharged four-stroke combustion engine of piston-and-cylinder type with compression ignition (1), whereby a controlled fuel quantity is supplied to the combustion chamber (2) for each work cycle, a first portion of said controlled fuel quantity is injected during the compression phase to initiate ignition before the upper dead center point, and a second portion is supplied (6) to the combustion chamber (2) as injected fuel for conventional initiation of ignition.

19 Claims, 1 Drawing Sheet

U.S. PATENT DOCUMENTS

| | | | |
|---|---|---|---|
| 6,935,304 B1 * | 8/2005 | Liu .......................... | 123/299 |
| 6,951,211 B1 * | 10/2005 | Bryant ................... | 123/559.1 |
| 6,994,072 B1 * | 2/2006 | Kuo et al. .................. | 123/295 |
| 2003/0150420 A1 * | 8/2003 | Ishikawa et al. ............ | 123/300 |
| 2004/0040541 A1 * | 3/2004 | Goto et al. ................. | 123/445 |
| 2004/0154582 A1 * | 8/2004 | Shimazaki .................. | 123/299 |
| 2005/0022755 A1 * | 2/2005 | Hitomi et al. ............. | 123/58.8 |

FOREIGN PATENT DOCUMENTS

| | | | |
|---|---|---|---|
| EP | 0 937 883 | | 8/1999 |
| GB | 2328717 | * | 3/1999 |
| JP | 2002-155780 | * | 5/2002 |
| WO | WO 0061927 | | 10/2000 |
| WO | WO 01/02710 | * | 1/2001 |

* cited by examiner

METHOD FOR FUEL INJECTION IN A COMBUSTION ENGINE, AND COMBUSTION ENGINE

FIELD OF THE INVENTION

The present invention relates to a method for regulating fuel injection in a combustion engine of piston-and-cylinder type and to a combustion engine with regulated fuel injection.

STATE OF THE ART

The problem of high $NO_x$ emissions from conventional diesel engines is a result of very high combustion temperatures in limited portions of the cylinder upon ignition, since combustion proceeds along a defined combustion front with a relatively low $\lambda$ value (air /fuel ratio).

It is known that injecting fuel very quickly into a compressed air/exhaust gas mixture with a high exhaust gas content, in a diesel engine, can cause a reduced combustion rate resulting in low smoke formation, low $NO_x$ emissions and high engine efficiency. According to the state of the art, part of the exhaust gases (EGR gases) is fed back from the engine's exhaust side to the inlet side of the engine in order to achieve a desired exhaust gas content in the combustion chamber. During feedback, the EGR gases pass through an EGR cooler to cool them down before they are introduced into the cylinder. The disadvantages of that solution are that it is problematical to cool and introduce sufficient exhaust gas quantities to enable a desired energy release process to take place. Moreover, it is difficult at the same time to introduce into the engine sufficient fresh air to be able to burn the amount of fuel required for the engine to generate a sufficiently high mean pressure at full load.

OBJECTS AND SUMMARY OF THE INVENTION

One object of the present invention is to indicate a method and a supercharged combustion engine whereby the disadvantages of the state of the art are eliminated or at least reduced.

This object is achieved according to the invention by a method for fuel injection of the kind mentioned in the introduction by injecting a first regulated fuel portion during the compression phase and a second fuel portion for conventional initiation of ignition, and by a combustion engine which supplies the fuel in the first and second portions.

The invention results, during the compression phase, in homogeneous combustion of the first portion of the fuel and part of the carbon dioxide required for achieving the low-emission combustion described above, which means that the engine needs less external exhaust gas feedback and can also be supplied with sufficient air to burn reliably and with low smoke formation the fuel quantity injected as the second portion. The combination of low sulphur content, high carbon monoxide content and high injection rate makes it possible during ignition delay to vaporise and mix the second fuel portion with the hot air/gas mixture which is present in the cylinder after the combustion of the first portion. The result will be reduced $NO_x$ emissions.

The fact that injection according to the invention takes place in the combustion chamber of a supercharged engine means that the first fuel portion can be held at such a level as to result in a significant $CO_2$ content after the combustion thereof. This is because the pressure prevailing in the combustion chamber makes a large first portion possible without causing knocking during its combustion. The result after the combustion of the first portion is a $CO_2$ content which has practical effects as regards reducing the combustion rate during the combustion of the second fuel portion.

The principle of the invention may be applied to all supercharged diesel engines and also with various diesel fuels.

A method is known from WO 00/61927 whereby a first fuel portion is injected already during the induction phase. However, a method according to that specification entails the problem of injecting the first fuel portion in a desired manner, since this would risk the fuel reaching the combustion chamber walls, resulting inter alia in danger to the lubricant film. According to the invention, on the contrary, the fact that the gases in the cylinder are compressed and therefore at a higher density means that the injected jets of the first fuel portion meet a greater resistance which breaks the injected drops up into smaller components. The drops thereby lose kinetic energy and therefore do not reach the combustion chamber walls. Instead they are vaporised in the gases in the combustion chamber.

It is preferred that the first fuel quantity be injected relatively late in the compression phase, with injection about 40° to 70° before the upper dead centre point being desirable and injection about 50° to 60° before the upper dead centre point being most preferable.

Engine operation may be optimised by varying the ratio between the first and second portions, depending on load. This is advantageously done on the basis of operating parameters such as engine speed, load, engine temperature, accelerator pedal position and/or exhaust gas composition. For example, this involves between about 10 and 25% of the fuel quantity being injected as the first fuel portion to ensure the formation of sufficient $CO_2$, but leaving at the same time sufficient oxygen for the main combustion. Too large a first portion risks leading to uncontrolled combustion.

Using one and the same injector, preferably of high-pressure type, means that no further element need be employed to implement the invention. All that is required is programming of the engine's control system for appropriate control of said injection.

Further advantages are achieved by various aspects of the invention and are indicated by the following detailed description.

BRIEF DESCRIPTION OF DRAWINGS

The invention will now be described in detail on the basis of an embodiment with reference to the attached drawings, in which.

DESCRIPTION OF AN EMBODIMENT

Figure 1:
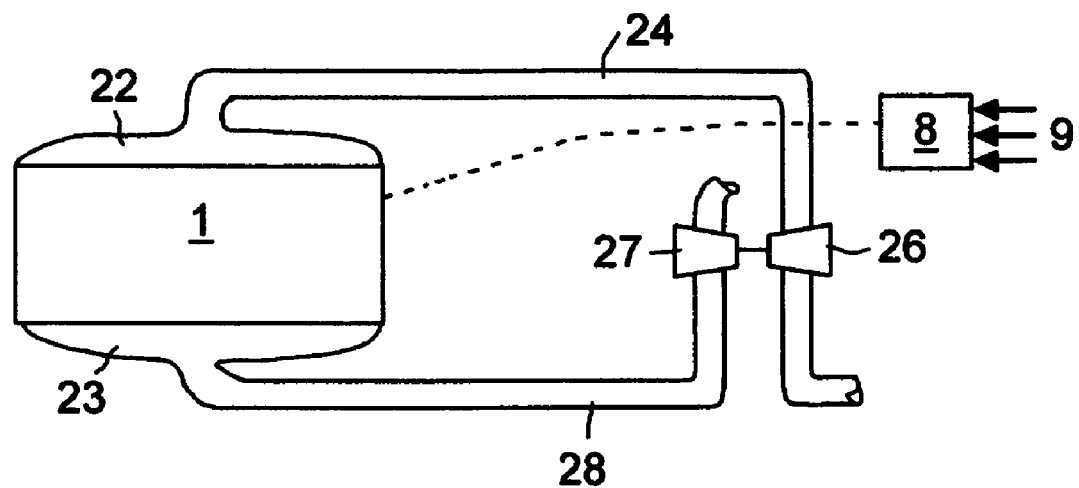
FIG. 1 depicts schematically a multi-cylinder combustion engine.

FIG. 1 depicts schematically a multi-cylinder supercharged combustion engine 1 of piston-and-cylinder type with compression ignition. An exhaust manifold 22 leads into an exhaust line 24 which itself leads the exhaust gases out to the environment via a turbo unit 26, 27. An inlet line 28 leads fresh air via the turbo unit to the engine's cylinders via a manifold arrangement 23. Ref. 8 denotes an engine control unit which controls the engine 1 on the basis of operating parameter signals 9.

Figure 2:
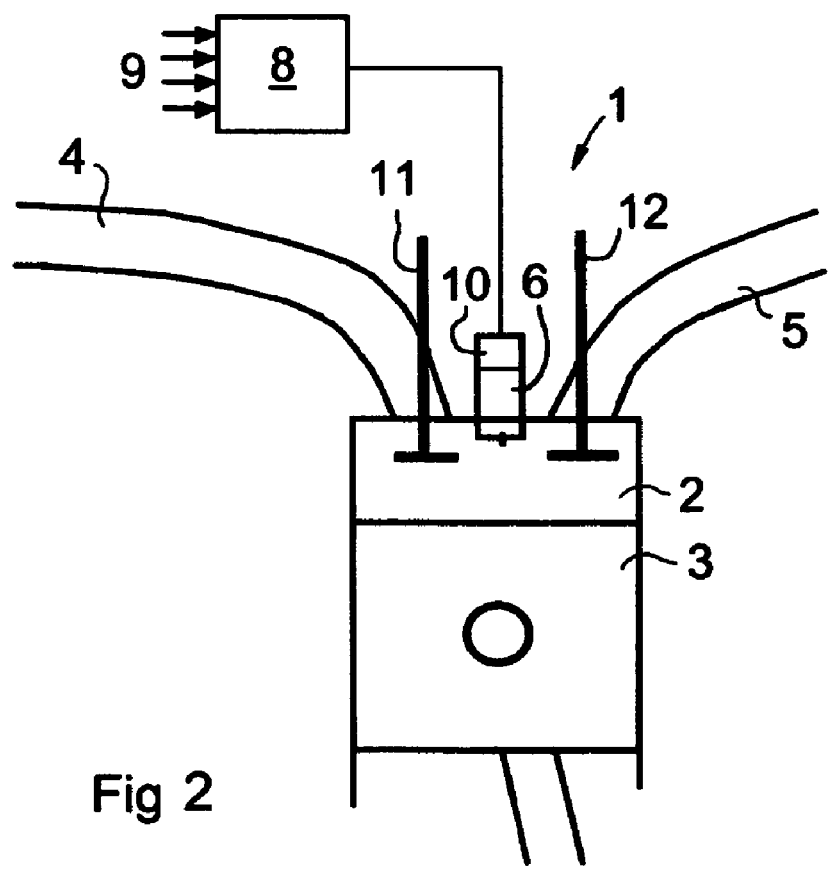
FIG. 2 depicts schematically a detail of the combustion engine in FIG. 1 equipped according to the invention.

The cylinder which is depicted schematically in more detail in FIG. 2 and forms part of the supercharged combustion engine 1 is thus of diesel type and incorporates a combustion 10 chamber 2 and a piston 3 which is movable in a cylinder. An inlet duct 4 leading into, and an outlet duct 5 leading out of, the combustion chamber 2 are provided in a usual way with conventional valves 11 and 12. As usual, at least one injection nozzle 6 for direct injection of fuel into the combustion chamber is inserted in a cylinder head.

Preferably the same injection nozzle 6 is used for injecting both a first and a second fuel portion.

A control unit 8 is supplied with signals 9 concerning engine operating parameters such as engine speed, load, engine temperature, accelerator pedal position, exhaust gas composition, etc. The control unit 8 is designed to control an injection valve 10 in order thereby to control fuel quantities injected via the injection nozzle 6. The injection valve 10 and the injection nozzle 6 preferably form part of a unit injector of high-pressure type which also incorporates an injection pump. The control unit is preferably programmed to control the ratio between the fuel quantities injected via the nozzle 6, the total quantity of fuel injected and possibly also the time when the respective injection takes place relative to the engine's crank angle. The control unit 8 is preferably an integrated part of the engine's normal control unit.

A method whereby fuel is injected quickly into a compressed air/exhaust gas mixture in a combustion chamber in order there to be mixed and vaporised to a homogeneous mixture, before the mixture ignites, results in very low soot and $NO_x$ discharges. This can be achieved in an advantageous manner with a method according to the present invention.

The first fuel portion has substantially to be burnt before the second portion is injected and begins to burn.

The possibility of post-injection of a smaller fuel quantity substantially immediately after the combustion of the second portion, the main portion, of the fuel is not excluded. In that case the amount involved is of the order of 5 to 10% of the total fuel quantity. The result will be reduced soot discharge, owing to post-combustion at low temperature.

It may be necessary to incorporate a multiplicity of nozzles in the respective cylinder to cater for the injections.

A supercharged engine according to the invention is suitable for powering a heavy vehicle. The engine is preferably run on diesel oil but it is also possible to use, for example, ethanol or methanol. The same fuel is intended to be used in both the first and the second portion.

The invention claimed is:

1. A method for fuel injection in a combustion engine of piston-and-cylinder type with compression ignition the method comprising
operating the engine with a compression phase in the combustion chamber and with an ignition phase in the combustion chamber,
supplying a regulated fuel quantity to the combustion chamber for each work cycle of the engine, the supplying comprising
injecting a first portion of said regulated fuel quantity during the compression phase of operation of the combustion chamber to initiate combustion of the first portion before an upper dead center point of a piston in the combustion chamber and without an ignition device initiating the combustion of the first portion, and later injecting a second portion of said regulated fuel quantity to the combustion chamber as injected fuel at a time for conventional initiation of the ignition phase in the combustion chamber wherein the second portion is injected after the first portion has substantially burnt.

2. A method according to claim 1, wherein the first portion of said regulated fuel quantity is injected during a latter half of the compression phase.

3. A method according to claim 2, wherein the first portion of said regulated fuel quantity is injected about 40° to 70° before the upper dead center point of the piston in the combustion chamber.

4. A method according to claim 3, wherein the first portion of said regulated fuel quantity is injected about 50° to 60° before the upper dead center point of the piston in the combustion chamber.

5. A method according to claim 1, further comprising regulating the ratio between the first and second portions on the basis of operating parameters selected from the group consisting of engine speed, engine load, engine temperature, accelerator pedal position of the vehicle including the engine and exhaust gas composition from the engine.

6. A method according to claim 1, wherein the first fuel quantity portion constitutes about 10 to 25% of the total fuel quantity injected.

7. A method according to claim 1, wherein diesel oil is used as the fuel.

8. A method according to claim 1, further comprising injecting both the first and the second fuel portion using the same injector, and controlling the injector for injecting the first and second fuel quantities.

9. Method according to claim 1, wherein the engine is a supercharged four stroke combustion engine.

10. A method according to claim 1, further comprising initiating the combustion phase while exhaust gases of the combustion of the first portion are in the combustion chamber.

11. A combustion engine of a piston-and-cylinder type and with compression ignition comprising
the engine having a combustion chamber, a piston movable in the combustion chamber through at least a compression phase and an ignition phase;
apparatus operable for supplying a regulated fuel quantity to the combustion chamber for each work cycle of the engine, the apparatus comprising:
an injector device operable to inject a first portion of said regulated fuel quantity into the combustion chamber during the compression phase to initiate combustion of the first portion without an operation of an ignition device in the combustion chamber; and the injector device is later operable to inject a second portion of the regulated fuel quantity into the combustion chamber at a time for conventional initiation of ignition in the ignition phase wherein the second portion is injected after the first portion has substantially burnt.

12. A combustion engine according to claim 11, wherein the injector device comprises a control unit which is operable to regulate injection of fuel quantity by the injector device on the basis of operating parameters of the engine.

13. A combustion engine according to claim 11, wherein the injector device comprises a high-pressure jet for injecting the first portion into the combustion chamber.

14. A combustion engine according to claim 11, wherein the apparatus operable for supplying fuel is operable such that up to about 25% of the total fuel quantity is injected as the first portion.

15. A combustion engine according to claim 11, wherein the apparatus operable for supplying fuel comprises one injector operable for injecting both the first and the second fuel portion, and a control unit for controlling the injecting.

16. A combustion engine according to claim 11, wherein the engine is a supercharged combustion engine.

17. A method for fuel injection in a combustion engine of piston-and-cylinder type with compression ignition the method comprising operating the engine with a compression phase in the combustion chamber and with an ignition phase in the combustion chamber, supplying a regulated fuel quantity to the combustion chamber for each work cycle of the engine, the supplying comprising injecting a first portion of said regulated fuel quantity during the compression phase of operation of the combustion chamber to mix with an air and exhaust gas mixture in the combustion chamber and to be vaporized to a homogeneous mixture to initiate homogeneous combustion before an upper dead center point of a piston in the combustion chamber, and later injecting a second portion of said regulated fuel quantity to the combustion chamber as injected fuel at a time for conventional initiation of the ignition phase in the combustion chamber wherein the second portion is injected after the injected first portion has substantially burnt.

18. A method according to claim 17, further comprising initiating the combustion phase while exhaust gases of the combustion of the first portion are in the combustion chamber.

19. A combustion engine of a piston-and-cylinder type and with compression ignition comprising the engine having a combustion chamber, a piston movable in the combustion chamber through at least a compression phase and an ignition phase;

apparatus operable for supplying a regulated fuel quantity to the combustion chamber for each work cycle of the engine, the apparatus comprising:

an injector device operable to inject a first portion of said regulated fuel quantity into the combustion chamber during the compression phase to mix with an air and exhaust gas mixture in the combustion chamber and to be vaporized to a homogeneous mixture to initiate homogeneous combustion, and the injector device being later operable to inject a second portion of said fuel quantity into the combustion chamber at a time for conventional initiation of ignition in the ignition phase wherein the second portion is injected after the injected first portion has substantially burnt.

* * * * *